(12) United States Patent
Tachibana et al.

(10) Patent No.: US 12,148,145 B2
(45) Date of Patent: Nov. 19, 2024

(54) INSPECTION SYSTEM, INSPECTION METHOD, AND INSPECTION PROGRAM

(71) Applicant: MITSUBISHI HEAVY INDUSTRIES, LTD., Tokyo (JP)

(72) Inventors: Takahiro Tachibana, Tokyo (JP); Akira Kono, Tokyo (JP); Yoshiyuki Otsubo, Tokyo (JP); Yusuke Yamashina, Tokyo (JP); Akihiro Tanaka, Tokyo (JP); Tatsuya Kimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 374 days.

(21) Appl. No.: 17/747,338

(22) Filed: May 18, 2022

(65) Prior Publication Data

US 2022/0375054 A1 Nov. 24, 2022

(30) Foreign Application Priority Data

May 21, 2021 (JP) ................................. 2021-086249

(51) Int. Cl.
*G06T 7/00* (2017.01)
*B22F 12/90* (2021.01)
(Continued)

(52) U.S. Cl.
CPC .............. *G06T 7/001* (2013.01); *B22F 12/90* (2021.01); *B28B 17/0072* (2013.01);
(Continued)

(58) Field of Classification Search
CPC . G06T 7/001; G06T 7/70; G06T 2207/20224;
G06T 5/50; G01N 21/8851; G01N 21/95;
G01N 2021/8887; B33Y 40/00; B22F
12/90; B22F 10/28; B28B 17/0072; B26B
1/001
(Continued)

(56) References Cited

U.S. PATENT DOCUMENTS

2010/0314029 A1* 12/2010 Lindgren ............ B29C 67/0048
700/110
2017/0014907 A1* 1/2017 Ng ........................ B29C 64/153
(Continued)

FOREIGN PATENT DOCUMENTS

JP 2017-7255 1/2017
JP 6708792 6/2020

OTHER PUBLICATIONS

Office Action issued Feb. 20, 2024 in corresponding German Patent Application No. 102022204872.5, with English-language translation.

*Primary Examiner* — Allen H Nguyen
(74) *Attorney, Agent, or Firm* — Wenderoth, Lind & Ponack, L.L.P.

(57) ABSTRACT

An inspection system for a fabricated object formed by layering powder includes an acquisition unit that acquires an image of a surface of each of layers, an identification unit that identifies a defect portion (protruding portion or recessed portion) on the surface of the powder and a position of the defect portion based on the acquired image, and a determination unit that determines that an abnormality occurs when the defect portion successively occurs at a same position in the plurality of layers.

9 Claims, 11 Drawing Sheets

(51) Int. Cl.

| | |
|---|---|
| *B28B 17/00* | (2006.01) |
| *B33Y 40/00* | (2020.01) |
| *G01N 21/88* | (2006.01) |
| *G01N 21/95* | (2006.01) |
| *G06T 5/50* | (2006.01) |
| *G06T 7/70* | (2017.01) |
| *B22F 10/28* | (2021.01) |
| *B28B 1/00* | (2006.01) |

(52) U.S. Cl.
CPC .......... *B33Y 40/00* (2014.12); *G01N 21/8851* (2013.01); *G01N 21/95* (2013.01); *G06T 5/50* (2013.01); *G06T 7/70* (2017.01); *B22F 10/28* (2021.01); *B28B 1/001* (2013.01); *G01N 2021/8887* (2013.01); *G06T 2207/20224* (2013.01)

(58) Field of Classification Search
USPC ........................................................ 382/141
See application file for complete search history.

(56) References Cited

U.S. PATENT DOCUMENTS

| | | | |
|---|---|---|---|
| 2019/0056334 A1* | 2/2019 | Safai | H04N 23/56 |
| 2021/0191372 A1* | 6/2021 | Kunkel | B22F 10/38 |
| 2021/0356404 A1 | 11/2021 | Safai | |
| 2021/0374936 A1* | 12/2021 | Koopman | G06N 3/08 |

* cited by examiner

INSPECTION SYSTEM, INSPECTION METHOD, AND INSPECTION PROGRAM

CROSS-REFERENCE TO RELATED APPLICATIONS

This application claims the benefit of priority to Japanese Patent Application Number 2021-086249 filed on May 21, 2021. The entire contents of the above-identified application are hereby incorporated by reference.

TECHNICAL FIELD

The disclosure relates to an inspection system, an inspection method, and an inspection program.

RELATED ART

Additive manufacturing (AM) products are manufactured by layering materials. A non-destructive inspection such as X-ray inspection may be performed as the quality assurance of the AM products.

Particularly, in Powder Bed Fusion (PBF), inspection may be performed by checking a state of powder laying during shaping (for example, refer to JP 6708792 B).

SUMMARY

Performing a non-destructive inspection such as x-rays as an inspection of AM products may lead to an increase in costs.

When a person determines images recording a state of powder laying during shaping, the number of images may be about 20,000 per fabricated object, which makes it difficult to efficiently perform inspection.

In determining the state of powder laying using image data of a shaped surface as disclosed in JP 6708792 B or the like, when the state of powder laying is determined to be abnormal by using the shaped surface of one layer, a huge number of layers may be determined to be abnormal, which may increase the burden of check operation.

The present disclosure has been made in view of such circumstances, and an object thereof is to provide an inspection system, an inspection method, and an inspection program, which can efficiently perform inspection.

A first aspect of the present disclosure is an inspection system for a fabricated object formed by layering materials, and the inspection system includes an acquisition unit that acquires an image of a surface of each of layers, an identification unit that identifies a defect portion on the surface of the layer and a position of the defect portion using the image, and a determination unit that determines that an abnormality occurs in a case in which the defect portion occurs successively at a same position in a plurality of layers.

A second aspect of the present disclosure is an inspection method for a fabricated object formed by layering materials, and the inspection method includes: acquiring an image of a surface of each of layers; identifying a defect portion on the surface of the layer and a position of the defect portion using the image; and determining that an abnormality occurs in a case in which the defect portion successively occurs at a same position in a plurality of layers.

A third aspect of the present disclosure is an inspection program for a fabricated object formed by layering materials, and the inspection program causes a computer to execute processing of acquiring an image of a surface of each of layers, processing of identifying a defect portion on the surface of the layer and the position of the defect portion using the image, and processing of determining that an abnormality occurs in a case in which the defect portion successively occurs at a same position in a plurality of layers.

According to the present disclosure, an effect of efficiently performing inspection may be achieved.

BRIEF DESCRIPTION OF DRAWINGS

The disclosure will be described with reference to the accompanying drawings, wherein like numbers reference like elements.

DESCRIPTION OF EMBODIMENTS

Hereinafter, an embodiment of an inspection system, an inspection method, and an inspection program according to the present disclosure will be described with reference to the drawings.

Figure 1:
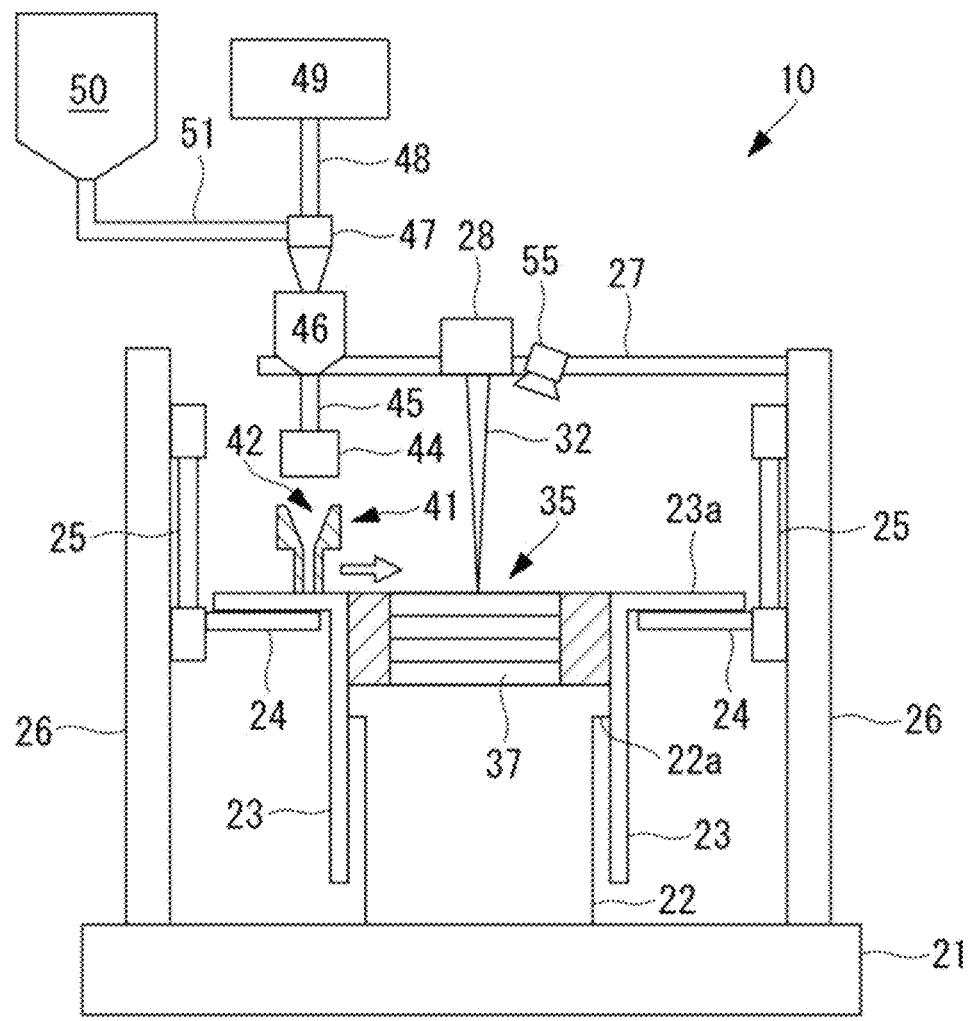
FIG. 1 is a diagram illustrating a schematic configuration of a shaping device according to an embodiment of the present disclosure.

FIG. 1 is a diagram illustrating a schematic configuration of a shaping device 10 according to the embodiment of the present disclosure.

A plate 22 and a column 26 are fixed to a base 21. The base 21 is installed such that its upper surface is horizontal. An upper surface of the plate 22 is also horizontal. Then, the upper surface of the plate 22 serves as a stage, and powder, which is a material, is laid over the upper surface of the plate 22 to form a shaped layer. The protruding portion 22a on a flange is formed on the entire periphery of the upper surface of the plate 22. The outer peripheral surface of the protruding portion 22a is in contact with the inner surface of the shaping tank 23, and powder may be retained in a space surrounded by the upper surface of the plate 22 and the inner surface of the shaping tank 23. The powder as a material is, for example, a material such as a metal material or a ceramic material. That is, the shaping device 10 forms a fabricated object by Powder Bed Fusion (PBF).

The powder is laid on a shaped portion 35 of the shaping tank 23 to form a powder layer. Then, by irradiating the powder layer with a laser 32, the powder is melted and fused to form a shaped layer (cured layer). In the present embodiment, a heat source for fusing the powder is described as the laser 32. The shaping tank 23 is movable in the vertical direction (the layering direction) and rises by a certain amount to layer and form shaped layers. Specifically, the support portion 24 supports a lower surface of a flange portion 23a such that an upper surface of the flange portion 23a of the shaping tank 23 is horizontal. The support portion 24 is connected to a driving portion 25 and moves the shaping tank 23 in the vertical direction. The driving portion 25 is fixed to the column 26 and is provided with a motor, for example.

A laser scanner 28 irradiates the powder layer formed on the shaped portion 35 with the laser 32. The laser scanner 28 is supported by the support portion 27 and may scan the laser 32 on the horizontal plane. That is, it is possible to selectively heat and solidify the powder at any position on the horizontal plane. The laser 32 is generated by a laser oscillator and introduced into the laser scanner 28 via an optical fiber.

The powder is supplied from a forming portion 41 in the shaped portion 35. For example, a pipe 51 and a pipe 48 are connected to a supply portion 46 via a branch 47, the supply portion 46 is decompressed by a decompressor 49 via the pipe 48, and the powder is supplied from a storage portion 50 to the supply portion 46 via the pipe 51. Then, the powder is supplied from the supply portion 46 to a distributor 44 via a pipe 45. The distributor 44 weighs the powder and supplies a predetermined amount of powder to a void 42 in the forming portion 41. Then, the forming portion 41 moves in the horizontal direction (direction orthogonal to the vertical direction) to form a powder layer on the shaped portion 35.

Specifically, in forming a fabricated object 37, the driving portion 25 moves the shaping tank 23 upward, thereby generating a step between the formed shaped surface and the upper surface of the flange portion 23a of the shaping tank 23. The forming portion 41 horizontally moves to form a new powder layer on the uppermost layer of the shaped layer formed by fusing. At this time, the uppermost powder layer and the upper surface of the flange portion 23a are flush with each other. Next, a predetermined region of the powder layer is selectively heated and solidified by irradiation with the laser 32. The shaped layer is formed in this manner. By moving the shaping tank 23 upward and repeating the same operation, the shaped layers are layered.

The shaping device 10 is also provided with a camera 55. The camera 55 is supported by the laser scanner 28 and the support portion 27, for example, and is provided near the laser scanner 28. Then, the camera 55 captures an image of the formed shaped portion 35 to generate an image of the formed shaped surface. The shaped surface is a surface of a layer to be shaped. The captured image is used in an inspection system 60 which will be described below. Specifications of the camera 55 are set based on desired detection resolution for a defect portion D. The captured image is, for example, a monochrome image. That is, any of values from 0 to an upper limit is set as a luminance value in each pixel of the image. The upper limit is 255 in 8 bits (256 gray scale). The image is displayed in black as the luminance value approaches 0 and is displayed in white as the luminance value approaches the upper limit. The defect portion D may appear white or black.

Next, an example of forming of each shaped layer will be described below using FIG. 2.

Figure 2:
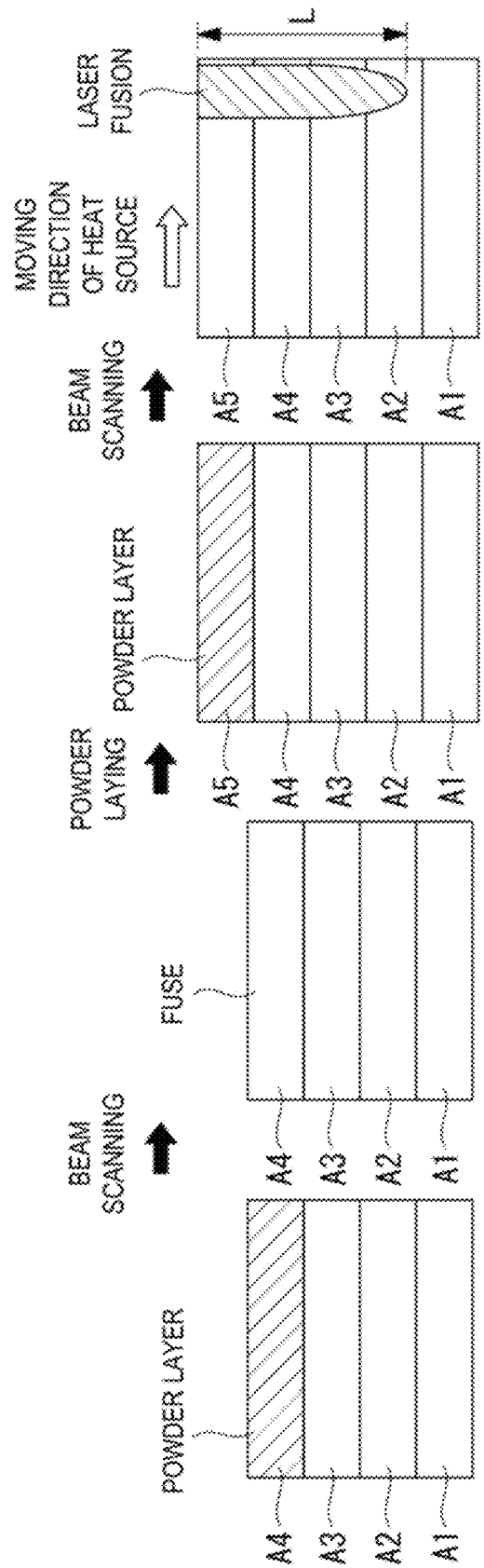
FIG. 2 is a diagram illustrating an example of forming shaped layers according to an embodiment of the present disclosure.

For example, as illustrated in FIG. 2, when a shaped layer A1, a shaped layer A2, and a shaped layer A3 are formed, shaping of a shaped layer A4 is started, and powder is laid on the upper portion of the shaped layer A3. In this way, a powder layer corresponding to the shaped layer A4 is formed. Then, beam scanning is performed to fuse the laid powder, and the shaped layer A4 is formed. Subsequently, shaping of a shaped layer A5 that is a next layer is started. Similarly, in the shaping of the shaped layer A5, the powder is laid to form a powder layer, and the powder is fused by beam scanning to form the shaped layer A5. In this manner, the shaped layers are layered to form a fabricated object.

Here, the laser 32 can fuse the powder within a fusion depth in the layering direction. The fusion depth of the laser 32 is a distance (depth) in the layering direction in which the powder is melted and fused by the laser (heat source) 32. The fusion depth is a depth of a predetermined distance L from the surface of the uppermost layer. As described above, the laser 32 can fuse the powder on the uppermost layer, as well as the powder located at a deep position. For example, the fusion depth (that is, the predetermined distance L) is several times larger than the thickness of one layer.

Next, the inspection system 60 in the shaping device 10 will be described.

Figure 3:
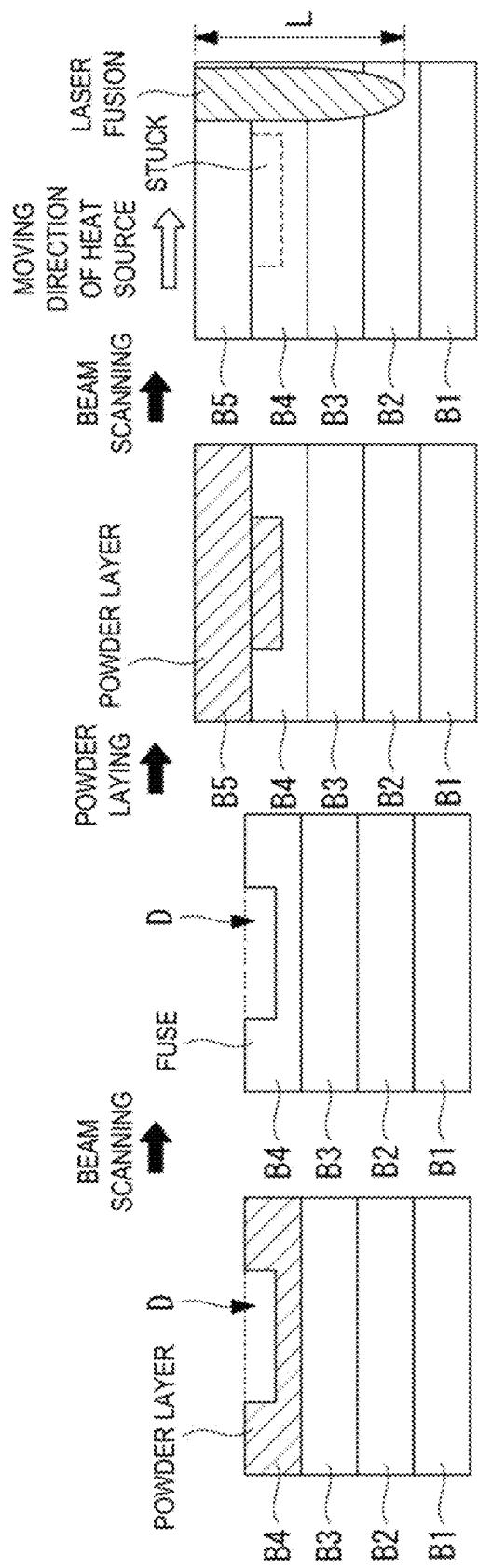
FIG. 3 is a diagram illustrating an example of forming shaped layers according to an embodiment of the present disclosure.

The inspection system 60 performs inspection of the fabricated object. For example, as illustrated in FIG. 3, when a shaped layer B1, a shaped layer B2, and a shaped layer B3 are formed, shaping of a shaped layer B4 is started, and the powder is laid on the upper portion of the shaped layer B3. It is assumed that a defect portion D occurred at this time. The defect portion D is a recessed portion in the surface of the shaped surface. The height of the shaped surface is substantially uniform in a normal state, but may be partially low (that is, recessed portion) in an abnormal state, and thus this recessed portion is referred to as a defect portion (abnormal portion) D. For example, a region that is lower than the surface of the normal layer (predetermined height) by a predetermined value or more may be defined as the defect portion D of the recessed portion. Specific examples of this abnormality include powder depression and powder shortage. At beam scanning, the defect portion D becomes a surface defect and remains on the surface of the shaped layer. When powder is laid in this state for forming the shaped layer B5, the powder is laid on the shaped layer B5 while filling the surface defect. When beam scanning is then performed, since the fusion depth of the laser 32 is sufficiently deeper than the layering height of the shaped layer B5, the shaped layer B5 is formed while fusing the powder on the defect portion D of the shaped layer B4. That is, the powder defects do not remain, which reduces any influence on internal quality.

Figure 4:
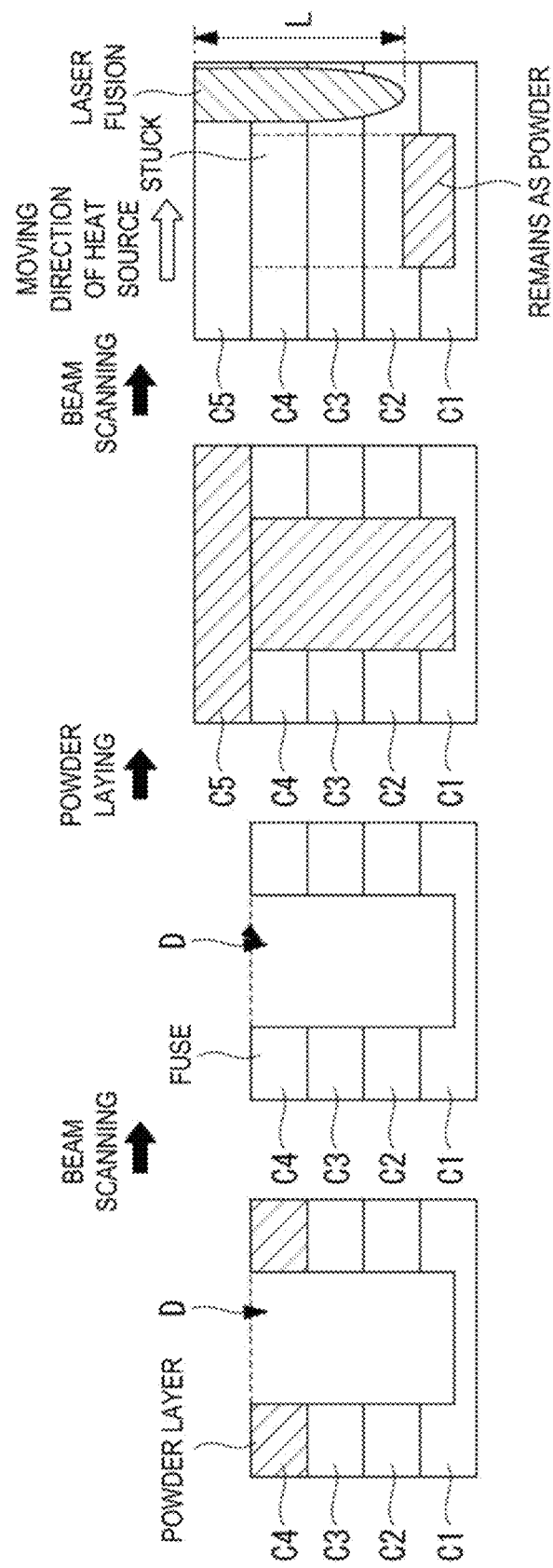
FIG. 4 is a diagram illustrating an example of forming shaped layers according to an embodiment of the present disclosure.

On the other hand, as illustrated in FIG. 4, in the case where a shaped layer C1, a shaped layer C2, and a shaped layer C3 are formed, and a defect portion D successively occurs in these layers at the same position, powder is laid for forming a shaped layer C4 on the upper portion of the shaped layer C3, and it is assumed that a further defect portion D also occurs in the shaped layer C4 at this time. Then, when beam scanning is performed, the defect portion D becomes a surface defect and remains on the surface of the shaped layer. When powder is laid in this state for forming the shaped layer C5, the powder is laid on the shaped layer C5 while filling the surface defect. When beam scanning is then performed, the powder of the defect portion D is also fused to form the shaped layer C5. However, the powder in the defect portion D below the fusion depth of the laser 32 is not fused and remains as an internal defect.

The inspection system 60 can efficiently inspect a fabricated object in consideration of the cases in FIGS. 3 and 4. The defect in the recessed portion has been described as the examples in FIGS. 3 and 4, but the protruding portion may be the defect portion (abnormal portion) D. For example, a region that is higher than the surface of the normal layer (predetermined height) by a predetermined value or more becomes the defect portion D of the protruding portion. Specific examples of this abnormality include powder drop and recoater interference. Even when the defect portion D is the protruding portion, since the amount of laid powder locally increases, a portion below the fusion depth may become an internal defect.

Figure 5:
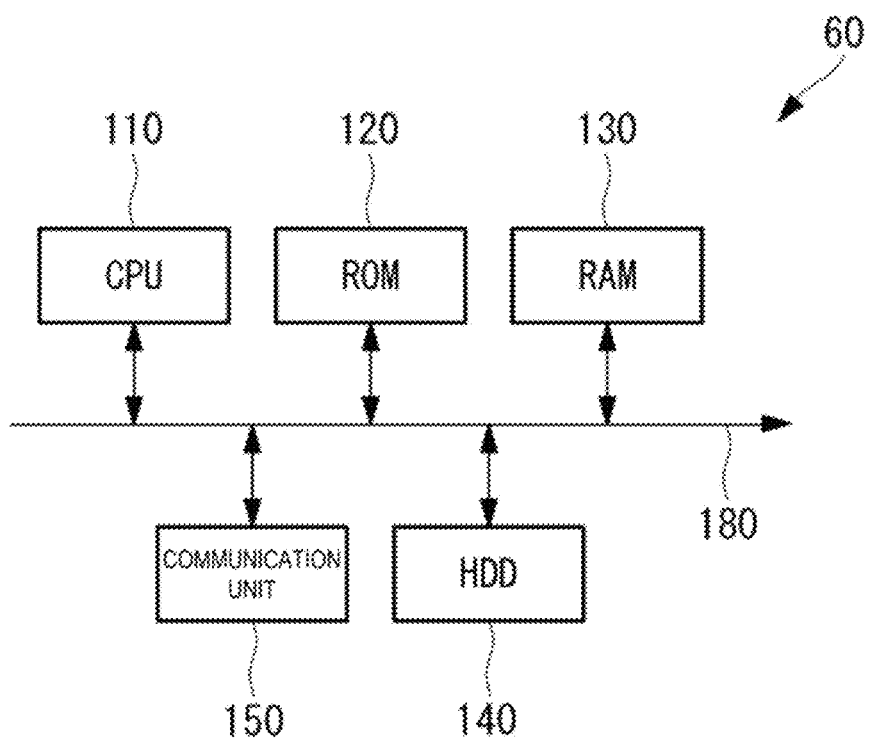
FIG. 5 is a diagram illustrating an example of a hardware configuration of an inspection system according to an embodiment of the present disclosure.

FIG. 5 is a diagram illustrating an example of the hardware configuration of the inspection system 60 according to the present embodiment.

As illustrated in FIG. 5, the inspection system 60 is a computer system, and includes, for example, a CPU 110, a Read Only Memory (ROM) 120 for storing programs or the like to be executed by the CPU 110, a Random Access Memory (RAM) 130 functioning as a work area when each program is executed, a hard disk drive (HDD) 140 as a mass storage device, and a communication unit 150 for connecting to a network or the like. Note that a solid state drive (SSD) may be used as the mass storage device. These portions are interconnected via a bus 180.

The inspection system 60 may include an input portion including a keyboard and a mouse, and a display portion including a liquid crystal display device for displaying data.

The storage medium for storing the program or the like executed by the CPU 110 is not limited to the ROM 120. For example, another auxiliary storage device such as a magnetic disk, a magneto-optical disk, or a semiconductor memory may be used.

A series of processing steps for achieving various functions to be described later is recorded in the hard disk drive 140 or the like in the form of a program, and the CPU 110 reads the program and writes it to the RAM 130 or the like to execute processing and arithmetic processing of information. This allows various functions to be described later to be achieved. As the program, a program pre-installed in the ROM 120 or another storage media, a program provided in a state of being stored in a computer readable storage medium, a program distributed through wired or wireless communication methods, or the like may also be used. Examples of the computer-readable storage medium include a magnetic disk, a magneto-optical disk, a CD-ROM, a DVD-ROM, and a semiconductor memory.

Figure 6:
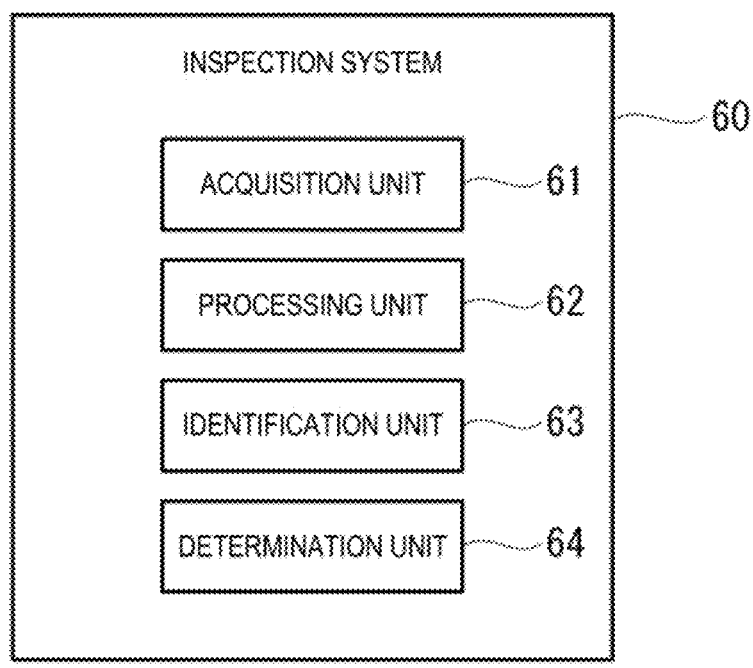
FIG. 6 is a functional block diagram illustrating functions of the inspection system according to an embodiment of the present disclosure.

FIG. 6 is a functional block diagram illustrating functions of the inspection system 60. As illustrated in FIG. 6, the inspection system 60 includes an acquisition unit 61, a processing unit 62, an identification unit 63, and a determination unit 64.

The acquisition unit 61 acquires an image of the surface of each layer. Specifically, the acquisition unit 61 acquires, for each layer, an image of the surface (shaped surface) of the shaped layer during shaping. In other words, inspection is performed on all (or some) of the shaped layers constituting the fabricated object. In particular, a state of powder laying of the image is recorded. The image capturing timing is preferably after the powder laying and before fusing (that is, before beam irradiation). This is due to that a defect in the recessed portion may be confirmed before and after fusing, while a defect in the protruding portion may be confirmed prior to fusing, but may be difficult to confirm after fusing since the surface is made even (made uniform in height) by beam irradiation. That is, even if the defect portion is a recessed portion or a protruding portion, it is possible to effectively determine the defect by image capturing before fusing (before beam irradiation). However, as long as a state of powder laying is recognized, both of images captured before and after fusing powder by beam irradiation may be used.

The processing unit 62 processes the acquired image. Specifically, the processing unit 62 applies image processing that emphasizes the defect portion D (feature extraction) to the acquired image. The image processing is at least one of trapezoidal correction, trimming, contrast adjustment, binarization, primary derivative, secondary derivative, contour extraction, and noise cancellation. Other image processing may be used as long as the defect portion D is emphasized (which makes it easy to determine the defect portion D).

Figure 7:
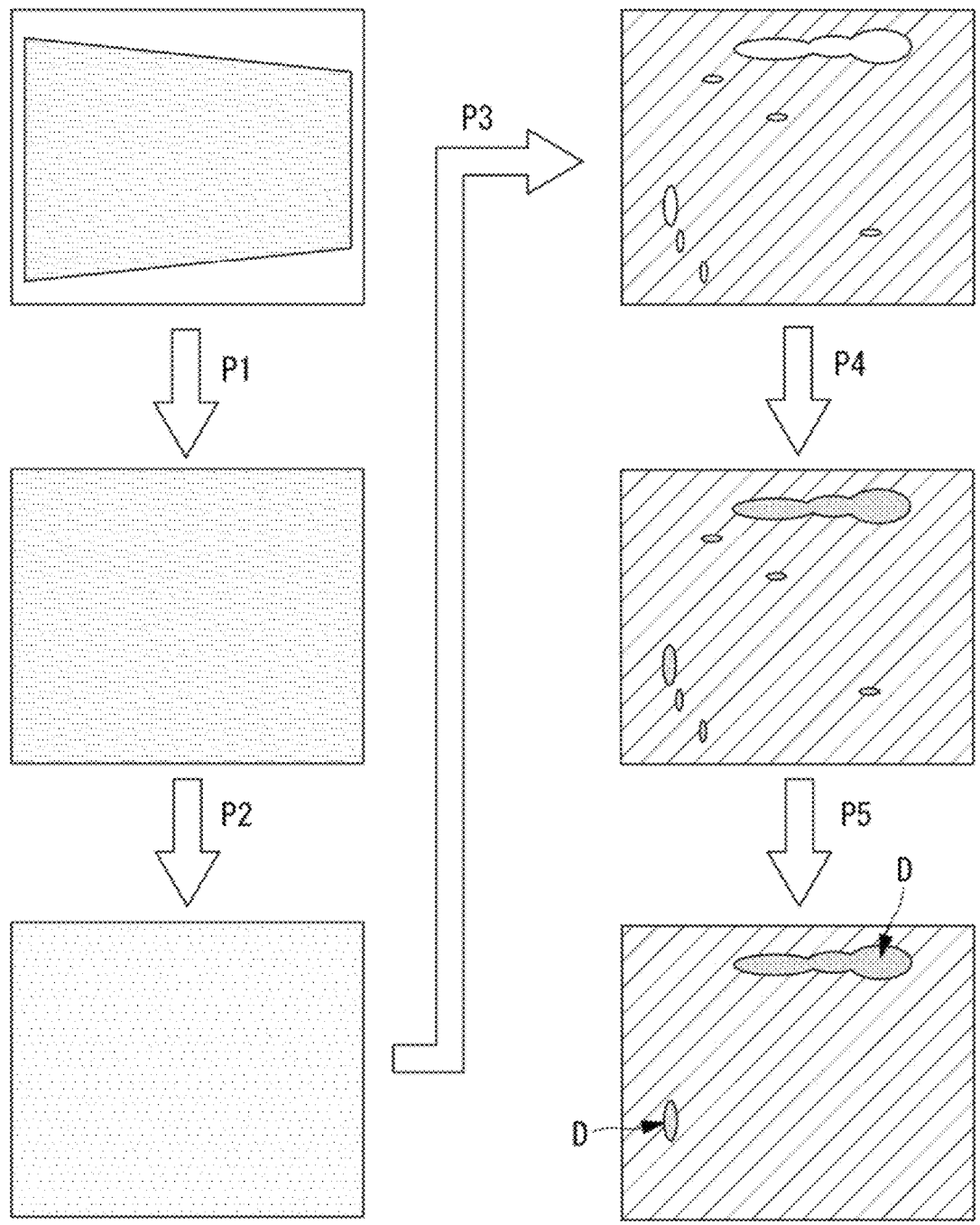
FIG. 7 is a diagram illustrating an example of image processing according to an embodiment of the present disclosure.

FIG. 7 is a diagram illustrating an example of image processing. In FIG. 7, the image processing proceeds in the direction of an arrow. First, an input image is a captured image. In capturing the shaped surface using the camera 55, the imaging direction of the camera 55 may be inclined with respect to the vertical direction. In such a case, the shaped surface appearing in the image is trapezoidal as illustrated in FIG. 7. For this reason, trimming and trapezoidal correction are performed as processing P1. Trimming is a processing of eliminating a portion other than the shaped surface from the image. The trapezoidal correction corrects the trapezoid shaping surface into a square shaped surface (as if it was captured just from the front).

Then, contrast adjustment is performed as processing P2, and binarization (or primary derivative or secondary derivative) is performed as processing P3. In this manner, the defect portion D is highlighted, and contour extraction is further performed as processing P4. Since noise is included in the image in this state, noise cancellation is performed as processing P5. In noise cancellation, the defect portion D that is smaller than set size (for example, area) may also be cancelled. In this way, the defect portion D is emphasized.

Figure 8:
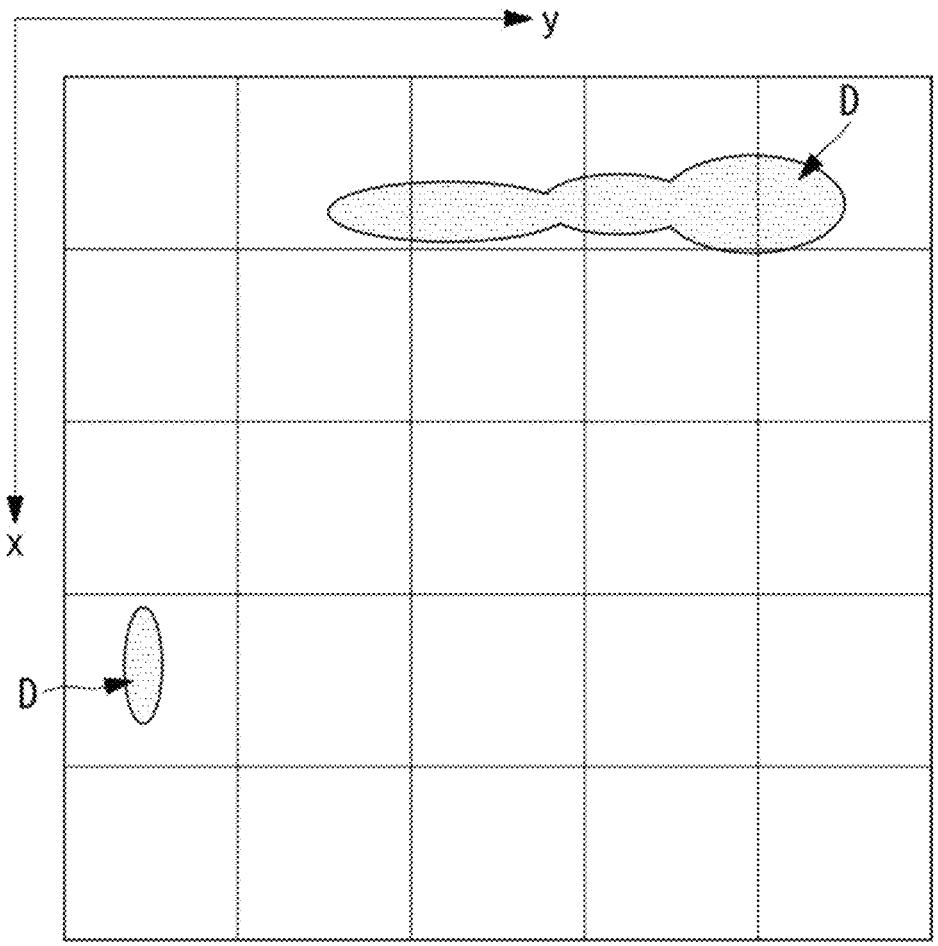
FIG. 8 is a diagram illustrating examples of a processed image according to an embodiment of the present disclosure.

FIG. 8 illustrates an example of an image after the image processing, in which the defect portions D are emphasized. Additionally, in FIG. 8, coordinates on the shaped surface (that is, the horizontal surface) are represented by an x-axis and a y-axis. In this manner, the defect portions D and their positions (coordinates) are read from the image.

Figure 9:
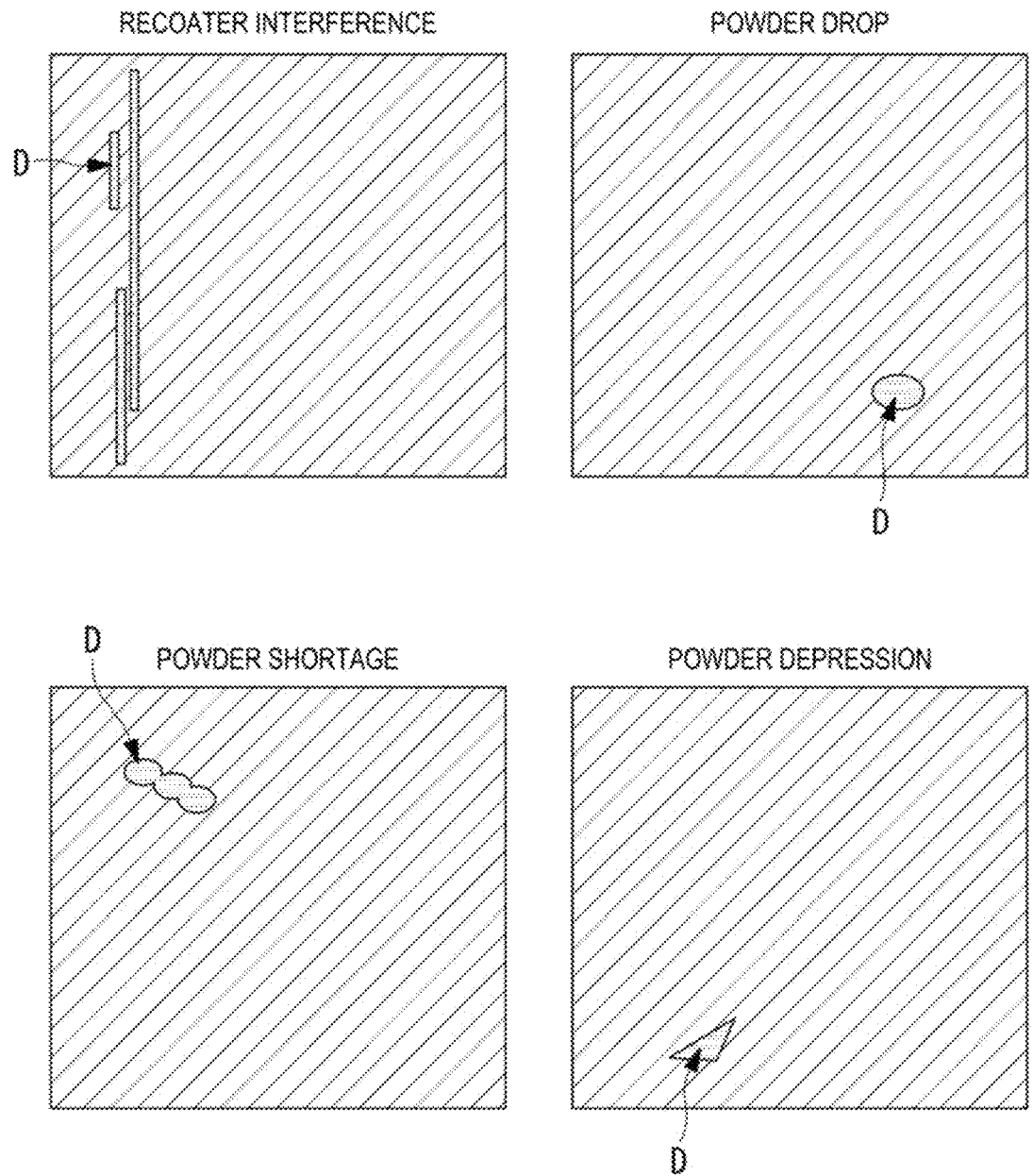
FIG. 9 is a diagram illustrating exemplary images of defect portions determined to be abnormal according to an embodiment of the present disclosure.

FIG. 9 illustrates images of exemplary abnormalities that are defect portions D. As illustrated in FIG. 9, abnormalities such as recoater interference, powder drop, a powder shortage, and powder depression appear as the defect portions D in an image.

The identification unit 63 identifies a defect portion D on the surface of the layer and the position of the defect portion D based on an image (processed image). As illustrated in FIG. 8, the defect portions D appear in the image. Thus, the identification unit 63 identifies the defect portions D and coordinates (positions) of the defect portions D on the shaped surface using the image. Since the defect portion D has a range, coordinates included in the range are preferably identified.

Although the image processing is applied to the captured image in the present embodiment, the image processing may be omitted as long as the defect portion D and its position can be identified.

When the defect portion D successively occurs at the same position in a plurality of layers, the determination unit 64 determines that an abnormality occurs. As described above, even if a defect occurs in only one layer as illustrated in FIG. 3, the defect may be corrected in the process of forming a next layer and thus, abnormality determination in a single layer causes a large burden of check operation. On the contrary, when a defect successively occurs as illustrated in FIG. 4, the defect that cannot be covered within the fusion depth of the laser 32 may remain as an internal defect. Therefore, when the defect portion D successively occurs at the same position in a predetermined number of layers or more, the determination unit 64 determines that an abnormality occurs. That is, based on the position of the defect portion D in each layer, which is identified by the identification unit 63, when the defect portion D occurs at the position having the same coordinates in a predetermined number of layers or more, the determination unit determines that an abnormality occurs.

Specifically, in the case where the fusion depth of the laser 32 is the predetermined distance L as illustrated in FIG. 4, a region where the powder that is not fused is included at a position that cannot be reached at the predetermined distance L become a defect. Thus, the predetermined number of layers is set such that a layering distance (distance in the layering direction) is the predetermined distance L or more. That is, the distance of the predetermined number of shaped layers in the layering direction is the predetermined distance L or more. Then, when the defect portion D successively occurs at the same position in the predetermined number of layers or more, the determination unit 64 determines that abnormality may occur. When determining that abnormality may occur, the determination unit 64 may issue a warning to an inspector or the like.

In the example illustrated in FIG. 4, the fusion depth of the laser 32 is the predetermined distance L, and the number of layers having the predetermined distance L or more is four layers. Thus, the predetermined number of layers is set to four layers. When the defect occurs at the same position in four successive layers as illustrated in FIG. 4, an internal defect occurs and thus, it is determined that an abnormality occurs. Note that even if the internal defect occurs, as long as the magnitude of the internal defect falls within an allowable range, the predetermined number of layers may be set corresponding to a distance greater than the predetermined distance L.

By making abnormality determination based on the defect portion D in the plurality of layers in this manner, a defect that can be corrected in the process of layering may be prevented from being determined to be abnormal, thereby making inspection efficient. For example, a non-destructive inspection or the like may be performed for a required range after an abnormality has been determined. In such a case, the inspection range of the non-destructive inspection may be limited.

Figure 10:
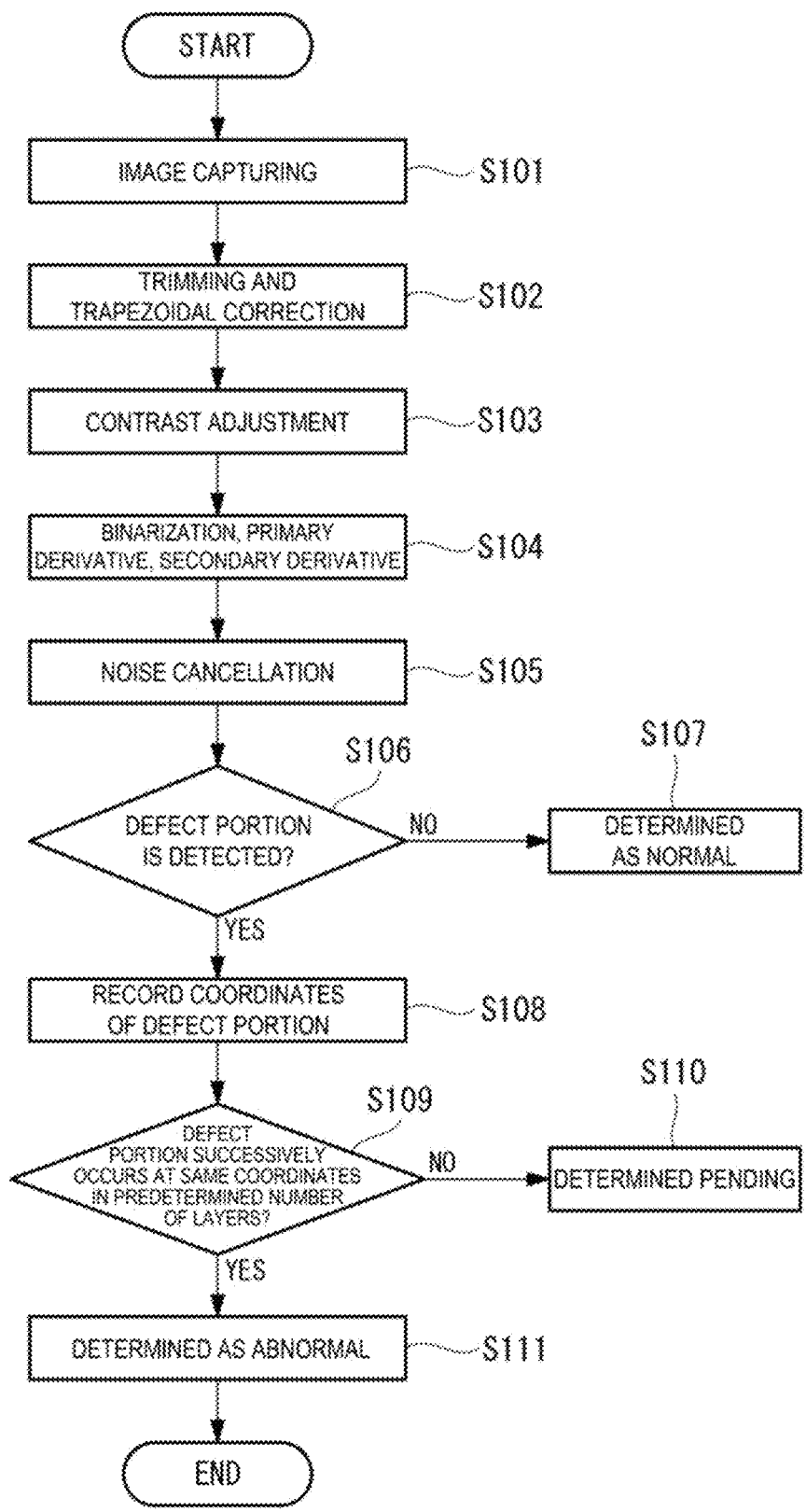
FIG. 10 is a flowchart illustrating an example of a procedure of an abnormality determination processing according to an embodiment of the present disclosure.

Next, an example of the abnormality determination processing by the inspection system 60 described above will be described with reference to FIG. 10. FIG. 10 is a flowchart illustrating an example of a procedure of the abnormality determination processing according to the present embodiment. The flow shown in FIG. 10 is performed, for example, each time a shaped layer is formed, and an image thereof is acquired. The flow may not be performed each time the image is acquired. Images of respective shaped layers may be accumulated, and the flow may be performed after shaping.

First, an image is captured (S101).

Next, trimming and trapezoidal correction are performed (S102). Next, contrast adjustment is performed (S103).

Next, binarization (or primary derivative or secondary derivative) is performed (S104). Then, noise cancellation is performed (S105). That is, S102 to S105 are steps for image processing.

Next, it is determined whether the defect portion D is detected (S106). For example, when the area of a region assumed as the defect portion D in the image is a threshold value or more, the region is determined to be the defect portion D. Note that, as long as the defect portion D can be determined based on the image, the determination method is not limited.

If the defect portion D is not detected (NO in S106), it is determined to be normal (S107).

If the defect portion D is detected (YES in S106), coordinates of the defect portion D are recorded (S108).

Next, it is determined whether the defect portion D occurs at the same coordinates in a predetermined number of successive layers (S109). In S109, the determination is made with reference to the record of the coordinates of the defect portions D in the lower shaped layers determined (step S108).

If the defect portion D does not occur at the same coordinates in the predetermined number of successive layers (NO in S109), abnormality determination is suspended (S110).

If the defect portion D has occurred at the same coordinates in the predetermined number of successive layers (YES in S109), it is determined that an abnormality occurs (S111).

Such processing may reduce the inspection burden while reducing a decrease in quality assurance.

Although the image processing of the processing unit 62 has been described above, other image processing may be executed. For example, by using an image including no defect portion D as the reference image, it is possible to reduce the influence of components included in the image. For example, the reference image is previously acquired as an image acquired by capturing a normal shaped surface assumed to include no defect portion D. The reference image may be simply an image of the shaped portion 35. First processing, second processing, and third processing will be described below as the processing using the reference image. The processing is executed, for example, between S102 and S103 in FIG. 10, but may also be executed before S102.

First, the first processing using the reference image is described.

Figure 11:
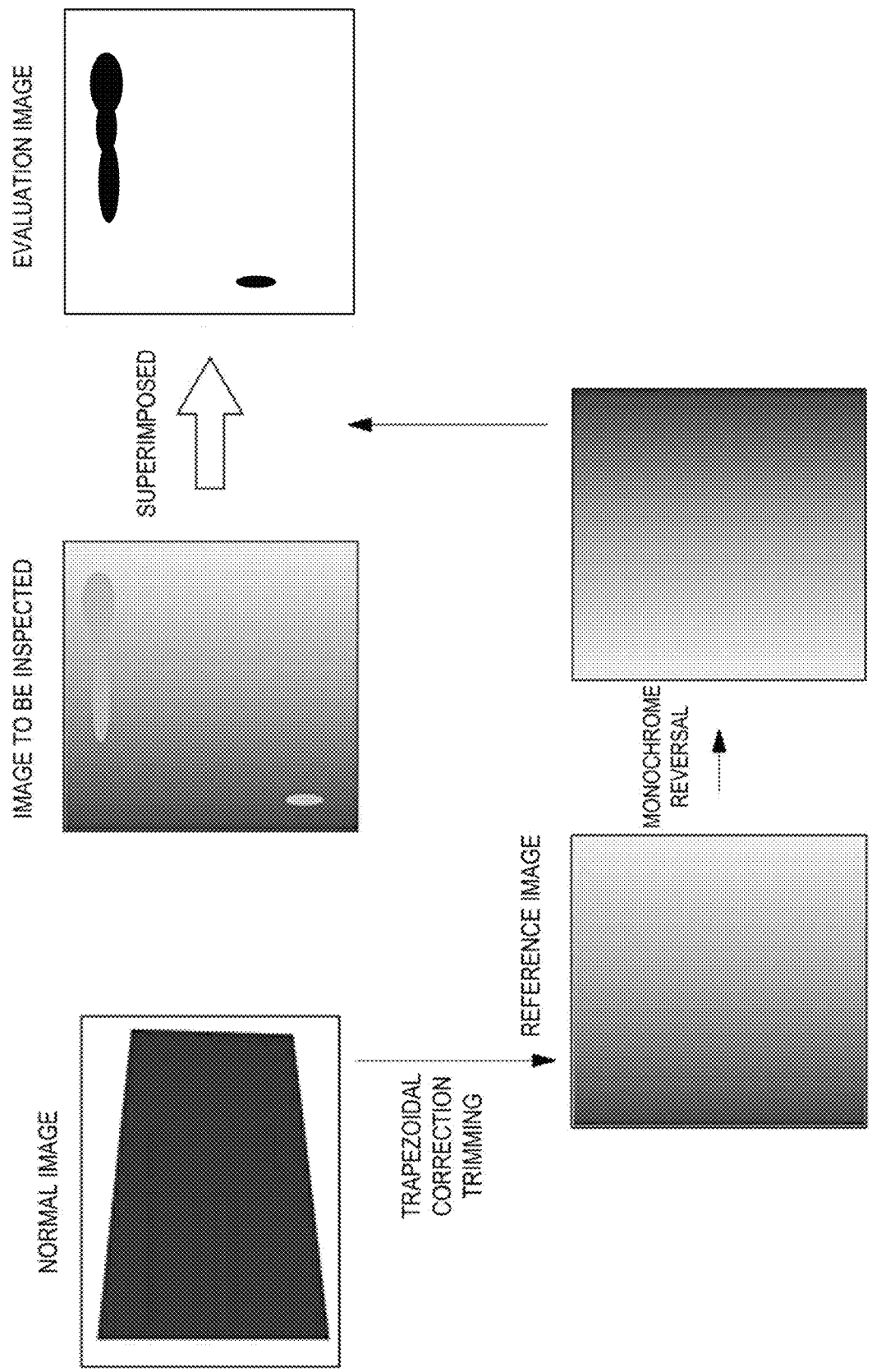
FIG. 11 is a diagram illustrating an example of first processing according to an embodiment of the present disclosure.

In the first processing, the processing unit 62 executes processing of superimposing a monochrome reverse image of the reference image on the captured image. FIG. 11 illustrates an example of the first processing. As illustrated in FIG. 11, the normal image is subjected to trimming and trapezoidal correction to acquire the reference image. Then, the monochrome reverse image of the reference image is generated. For example, the monochrome reverse image is superimposed on (added to) the image subjected to the step S102 in FIG. 10 to acquire an evaluation image. The step S103 and subsequent steps in FIG. 10 are executed using this evaluation image.

By using the monochrome reverse image of the reference image in this manner, an original variation in the luminance may be averaged to emphasize the defect portion D. When the monochrome reverse image of the reference image is added in the case where the defect portion D appears black (low luminance), the luminance value can become an upper limit or more. In this case, the location (pixel) at which the luminance value becomes the upper limit or more after the above combination may be displayed with the luminance value that is the upper limit. In this manner, the defect portion D displayed in black is emphasized. Note that the location at which the luminance value may be the upper limit or more after the combination is a location corresponding to a normal shaped surface including no defect portion D in the evaluation image.

Next, the second processing using the reference image will be described. In the second processing, the processing unit 62 executes processing of subtracting the reference image from the captured image. Specifically, an evaluation image is acquired by subtracting the reference image from the image subjected to the step S102. The step S103 and subsequent steps in FIG. 10 are executed using this evaluation image.

By using the reference image in this manner, an original variation in luminance in the image may be suppressed to emphasize the defect portion D. When the reference image is subtracted in the case where the defect portion D appears white (high luminance), the luminance value may be 0 or less. In this case, the location (pixel) at which the luminance value is 0 or less after the above combination may be displayed with the luminance value 0 (lower limit). In this manner, the defect portion D displayed in white is emphasized. Note that the location at which the luminance value may be 0 or less after the combination is a location corresponding to a normal shaped surface including no defect portion D in the evaluation image.

Next, the third processing using the reference image will be described.

In the third processing, both the first processing and the second processing are executed. That is, the monochrome reverse image of the reference image is superimposed on (added to) the captured image to acquire a first evaluation image. Using this first evaluation image, the step S103 and subsequent steps in FIG. 10 are executed. That is, the defect portion D is identified based on the first evaluation image. When the monochrome reverse image of the reference image is added in the case where the defect portion D appears black (low luminance), the luminance value may be an upper limit or more. In this case, the location (pixel) at which the luminance value is the upper limit or more after the above combination is preferably displayed with the luminance value that is the upper limit. Note that the location at which the luminance value may be the upper limit or more after the combination is a location corresponding to a normal shaped surface including no defect portion D in the evaluation image.

A second evaluation image is acquired by subtracting the reference image from the image subjected to the step S102. The step S103 and subsequent steps in FIG. 10 are executed using this second evaluation image. In this manner, the defect portion D is also identified based on the second evaluation image. When the reference image is subtracted in the case where the defect portion D appears white (high luminance), the luminance value may be 0 or less. In this case, the location (pixel) at which the luminance value is 0 or less after the above combination is preferably displayed with the luminance value 0. Note that the location at which the luminance value may be 0 or less after the combination is a location corresponding to a normal shaped surface including no defect portion D in the evaluation image.

Then, the defect portion D identified based on the first evaluation image and the position of the defect portion D are combined with the defect portion D identified based on the second evaluation image and the position of the defect portion D to record the defect portion D with respect to the original captured image and the position (coordinates) of the defect portion D. The third processing addresses both the first processing and the second processing and thus, may further emphasize the defect portion D.

The image acquired by capturing the shaped surface has a luminance distribution even if there is no defect. The luminance distribution and the average luminance may vary depending on the shaping device 10 (in particular, the camera 55). However, by executing processing using the reference image, the defect may be determined while suppressing device dependence.

As described above, according to the inspection system, the inspection method, and the inspection program according to the present embodiment, inspection burden of internal defect may be reduced by identifying the defect portion D and the position of the defect portion D based on the image of the surface of the layer, and determining that an abnormality occurs when the defect portion D successively occurs at the same position. For example, abnormality determination for each layer requires check operation for each abnormality, but even when the defect portion D occurs in a certain layer, the defect portion D can be corrected unless the defect portion D is formed at the same position in a next layer. That is, the internal quality might be affected when the defect portion D occurs at the same position in a plurality of successive layers. Thus, by determining that an abnormality occurs when the defect portion D occurs at the same position in a plurality of successive layers, the burden of check operation may be reduced to make inspection efficient.

When a distance in a layering direction in which the powder can be fused using the heat source is a predetermined distance L, the predetermined number of layers are set to a number of layers having the predetermined distance L or more. The determination unit 64 determines that an abnormality occurs when the defect portion D occurs at the same position in a plurality of successive layers, thereby efficiently performing inspection while reducing a decrease in internal quality.

The present disclosure is not limited to the embodiments described above, and various modifications within the scope of the disclosure can be made. Note that the embodiments can be combined.

The inspection system, the inspection method, and the inspection program according to each of the embodiments described above are grasped as follows, for example.

An inspection system (60) according to the present disclosure is an inspection system for a fabricated object formed by layering materials (powder), and includes an acquisition unit (61) that acquires an image of a surface of each of layers, an identification unit (63) that identifies a defect portion (D) on the surface of the layer and a position of the defect portion based on the image, and a determination unit (64) that determines that an abnormality occurs when the defect portion successively occurs at a same position in the plurality of layers.

According to the inspection system according to the present disclosure, inspection burden of internal defect may be reduced by identifying the defect portion and the position of the defect portion based on the image of the surface of the layer, and determining that an abnormality occurs when the defect portion successively occurs at the same position. For example, abnormality determination for each layer requires check operation for each abnormality, but even when the defect portion occurs in a certain layer, the defect portion can be corrected unless the defect portion is formed at the same position in a next layer. That is, it is deemed that the internal quality is affected when the defect portion occurs at the same position in a plurality of successive layers. Thus, by determining that an abnormality occurs when the defect portion occurs at the same position in a plurality of successive layers, burden of check operation may be reduced to make inspection efficient.

In the inspection system according to the present disclosure, the fabricated object may be formed of the layers formed by fusing powder using a heat source (32), the determination unit may determine that an abnormality occurs when the defect portions successively occur at the same positions in a predetermined number of layers or more, and when a distance in a layering direction in which the powder can be fused by the heat source is set to a predetermined distance (L), the predetermined number of layers may be set to a number of layers having the predetermined distance or more.

According to the inspection system according to the present disclosure, when a distance in a layering direction in which the powder can be fused by the heat source is set as a predetermined distance, the predetermined number of layers are set to the number of layers having the predetermined distance or more. The determination unit determines that an abnormality occurs when the defect portion occurs at the same position in a plurality of successive layers, thereby efficiently performing inspection while reducing a decrease in internal quality.

The inspection system according to the present disclosure may further include a processing unit (62) that applies image processing of emphasizing the defect portion to the acquired image, and the identification unit may identify the defect portion and the position of the defect portion based on the processed image.

In the inspection system according to the present disclosure, the defect portion can be efficiently determined by executing image processing of emphasizing the defect portion.

In the inspection system according to the present disclosure, the image processing may include at least one of trapezoidal correction, trimming, contrast adjustment, binarization, primary derivative, secondary derivative, contour extraction, and noise cancellation of the surface.

In the inspection system according to the present disclosure, the defect portion may be emphasized by at least one of trapezoidal correction, trimming, contrast adjustment, binarization, primary derivative, secondary derivative, contour extraction, and noise cancellation of the surface.

In the inspection system according to the present disclosure, using the image including no defect portion as a reference image, the processing unit may execute processing of superimposing a monochrome reverse image of the reference image upon the image.

In the inspection system according to the present disclosure, by using the image including no defect portion as the reference image and executing the processing of superimposing the monochrome reverse image of the reference image on the image, the effect of monochrome shade originally contained in the image may be suppressed to emphasize the defect portion.

In the inspection system according to the present disclosure, using the image including no defect portion as a reference image, the processing unit may execute processing of subtracting the reference image from the image.

According to the inspection system according to the present disclosure, by using the image including no defect portion as the reference image and executing the processing of subtracting the reference image from the image, the effect of monochrome shade originally contained in the image may be suppressed to emphasize the defect portion.

In the inspection system according to the present disclosure, by using the image including no defect portion as a reference image, the processing unit may execute processing of subtracting the reference image from the image, setting, to 0, a luminance value of a region where a luminance value is 0 or less, adding a monochrome reverse image of the reference image to the image, and setting a luminance value of a region where a luminance value is an upper limit or more to the upper limit.

In the inspection system according to the present disclosure, by using the image including no defect portion as the reference image, subtracting the reference image from the image, and setting, to 0, the luminance value of the location where a luminance value is 0 or less, the defect portion displayed in color close to white (luminance value is close to the upper limit) in the image may be emphasized. Then, by adding the monochrome reverse image of the reference image to the image and setting the luminance value of the location where the luminance value is the upper limit or more to the upper limit, the defect portion displayed in color close to black (luminance value is close to 0) in the image may be emphasized.

An inspection method according to the present disclosure is an inspection method for a fabricated object formed by layering materials, and the inspection method includes: acquiring an image of a surface of each of layers; identifying a defect portion on the surface of the layer and a position of the defect portion based on the image; and determining that an abnormality occurs when the defect portions successively occurs at a same position in the plurality of layers.

An inspection program according to the present disclosure is an inspection program for a fabricated object formed by layering materials, and the inspection program causes a computer to execute processing of acquiring an image of a surface of each of layers, processing of identifying a defect portion on the surface of the layer and a position of the defect portion based on the image, and processing of determining that an abnormality occurs when the defect portion successively occurs at a same position in the plurality of layers.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An inspection system for a fabricated object formed by layering a plurality of materials, the inspection system comprising:
    an acquisition unit configured to acquire an image of a surface of an individual layer of a plurality of layers;
    an identification unit configured to identify a defect portion on the surface of the individual layer and a position of the defect portion using the image; and
    a determination unit configured to determine that an abnormality occurs in a case in which the defect portion successively occurs at a same position in a plurality of layers.

2. The inspection system according to claim 1, wherein the fabricated object is formed of a plurality of layers by fusing powder using a heat source,
    the determination unit determines that an abnormality occurs in a case in which the defect portion successively occurs at a same position in a predetermined number of layers or more, and by setting a distance in a layering direction in which the powder can be fused using the heat source as a predetermined distance, the predetermined number of layers are set to a number of layers having the predetermined distance or more.

3. The inspection system according to claim 1, further comprising a processing unit configured to apply image processing of emphasizing the defect portion to the acquired image, wherein
the identification unit identifies the defect portion and the position of the defect portion using the processed image.

4. The inspection system according to claim 3, wherein the image processing includes at least one of trapezoidal correction, trimming, contrast adjustment, binarization, primary derivative, secondary derivative, contour extraction, and noise cancellation of the acquired surface.

5. The inspection system according to claim 3, wherein, by using the image including no defect portion as a reference image, the processing unit performs processing of superimposing a monochrome reverse image of the reference image on the image.

6. The inspection system according to claim 3, wherein, by using the image including no defect portion as a reference image, the processing unit performs processing of subtracting the reference image from the image.

7. The inspection system according to claim 3, wherein, by using the image including no defect portion as a reference image, the processing unit performs processing of subtracting the reference image from the image, setting, to 0, a luminance value of a region where a luminance value is 0 or less, adding a monochrome reverse image of the reference image to the image, and setting a luminance value of a region where a luminance value is an upper limit or more to the upper limit.

8. An inspection method for a fabricated object formed by layering a plurality of materials, the inspection method comprising:
acquiring an image of a surface of an individual layer of a plurality layers;
identifying a defect portion on the surface of the individual layer and a position of the defect portion using the image; and
determining that an abnormality occurs in a case in which the defect portion successively occurs at a same position in a plurality of layers.

9. A non-transitory computer readable storage medium storing an inspection program for a fabricated object formed by layering a plurality of materials, the inspection program causing a computer to execute:
acquiring an image of a surface of an individual layer of a plurality of layers;
identifying a defect portion on the surface of the individual layer and a position of the defect portion using the image; and
determining that an abnormality occurs in a case in which the defect portion successively occurs at a same position in a plurality of layers.

* * * * *